(12) United States Patent
Kelderman (10) Patent No.: US 8,931,997 B2
(45) Date of Patent: Jan. 13, 2015

(54) BALE LOADING TRAILER AND METHOD OF USING SAME

(76) Inventor: Gary L Kelderman, Oskaloosa, IA (US)

( * ) Notice: Subject to any disclaimer, the term of this patent is extended or adjusted under 35 U.S.C. 154(b) by 415 days.

(21) Appl. No.: 13/479,627

(22) Filed: May 24, 2012

(65) Prior Publication Data

US 2013/0315694 A1 Nov. 28, 2013

(51) Int. Cl.
*B60P 1/04* (2006.01)

(52) U.S. Cl.
USPC .......................................................... 414/482

(58) Field of Classification Search
CPC ....... B60P 3/1033; B60P 1/025; B60P 1/6454
USPC ................... 414/482, 475, 111, 480, 502, 503
See application file for complete search history.

(56) References Cited

U.S. PATENT DOCUMENTS

| | | | |
|---|---|---|---|
| 6,073,946 A | 6/2000 | Richardson | |
| 6,398,236 B1 | 6/2002 | Richardson | |
| 7,398,873 B2 | 7/2008 | Foster et al. | |
| 7,556,141 B2 | 7/2009 | Foster et al. | |
| 7,604,109 B2 | 10/2009 | Foster et al. | |
| 7,736,114 B2 | 6/2010 | Foster et al. | |
| 7,789,218 B2 | 9/2010 | Foster et al. | |
| 8,006,828 B2 | 8/2011 | Stout et al. | |
| 2011/0318150 A1 | 12/2011 | Kelderman | |
| 2012/0045310 A1 | 2/2012 | Kelderman | |

OTHER PUBLICATIONS

Keith MFG. CO., Keith Walking Floor, brochure—two sheets, 2004, USA.
Keith MFG. CO., The Keith M-Series Drive, brochure—two sheets, 2007, USA.
Keith MFG. CO., The Keith Workhorse Hydraulic Drive Unit, brochure—two sheets, 2005, USA.
SAF-Holland USA, Inc., Neway AD Series, brochure—eight sheets, USA.
SAF-Holland USA, Inc., Neway ADZ Air Suspension, brochure—seven sheets, USA.

*Primary Examiner* — Saul Rodriguez
*Assistant Examiner* — Emery Hassan
(74) *Attorney, Agent, or Firm* — Sturm & Fix LLP (57) ABSTRACT

An apparatus for picking up stacks of bales and moving them into and/or out from a trailer. The trailer has a moving floor and is pivotally attached to the prime mover along a vertical axis and along a horizontal axis. Tandem wheels attached to the frame are moveable between a forward position and a rear position and can be locked in either the forward or rear position. Ground engaging tracks are attached to the trailer for moving the trailer forward or back. A starter conveyor section operatively attached to the rear of the trailer with a forward end being adjacent to the rear of the moving floor. The starter conveyor section tilts with the trailer to have a first elevated position when the frame is in transport position and a second position close to the ground when the trailer is in the tilted loading/unloading position.

3 Claims, 7 Drawing Sheets

BALE LOADING TRAILER AND METHOD OF USING SAME

TECHNICAL FIELD

This invention relates generally to a device for loading bales into a trailer for transporting the bales to another place and more particularly to a bale loading trailer that simplifies and speeds up the loading process.

BACKGROUND

Published U.S. PATENT Application No. 2011/0318150 to a Bale Picking Truck by Kelderman shows a method and apparatus for quickly and efficiently picking up and removing biomass bales from a field in which the biomass was baled, compactly stacking the bales after picking the bales off the ground and efficiently depositing the bales on the ground at a staging area for later loading onto a semi trailer, straight truck, or train car, which application is incorporated herein by reference in its entirety.

Published U.S. Patent Application No. 2012/0045310 to a Bale De-Stacker by Kelderman relates to a method and apparatus for efficiently un-stacking square bales from a stack and conveying the square bales in small sets or individually once they arrive from their aforementioned staging area to the place that they are to be used, such as in an ethanol production plant or a plant where the bales are to be burned for fuel.

Finding an existing device to efficiently load the bales from the ground at the staging area onto a truck or from the aforementioned Bale Picking Truck to move them to a place to be used, such as to a Bale De-Stacker at an ethanol production plant or a plant where the bales are to be burned for fuel, is problematic.

Accordingly, there is a need for a method and apparatus for efficiently load the bales from the staging area onto a truck to move them to a place to be used.

BRIEF DESCRIPTION OF THE DRAWINGS

The above mentioned problematic situation is at least partially solved through provision of the method and apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-9 show a preferred embodiment of the present invention.

Figure 1:
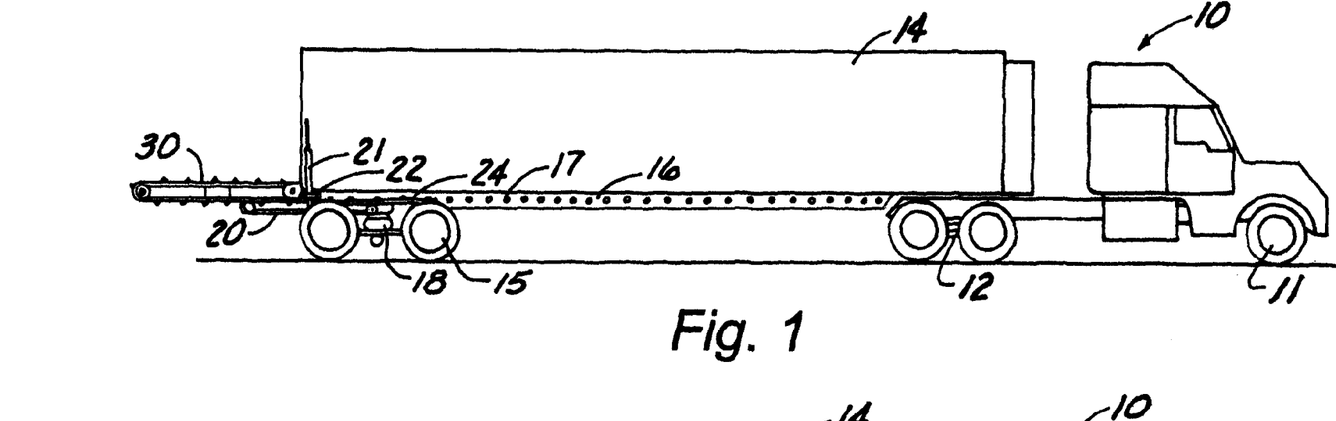
FIG. 1 is a side elevational view of a bale loading trailer constructed in accordance with the present invention and shown in a configuration when it can be driven over public and/or private roads from place to place.

Referring now to FIG. 1 the bale loading trailer 10 of the present invention is shown in a configuration wherein it can be driven over public and/or private roads from place to place, either empty or loaded. The bale loading trailer 10 has a tractor portion 11, with a front and rear set of wheels 11 and 12 respectively. A trailer 14 is attached to the tractor 11 in a conventional fashion.

Figure 2:
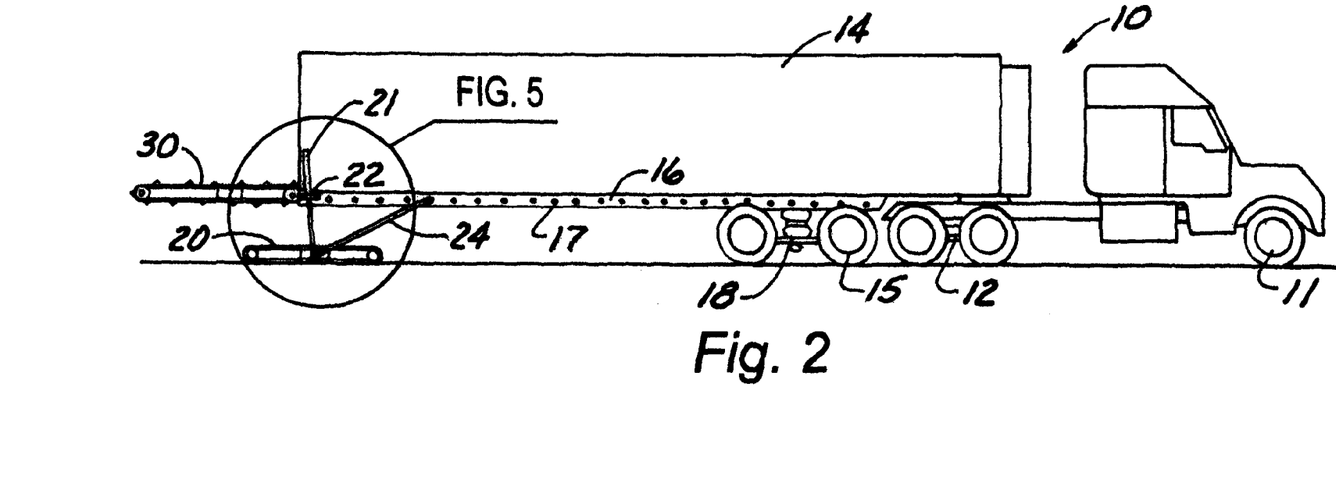
FIG. 2 is a side elevational view of the bale loading trailer shown in FIG. 1, but with a rear set of trailer wheels moved to a forward position after ground engaging tracks have been lowered.
Figure 3:
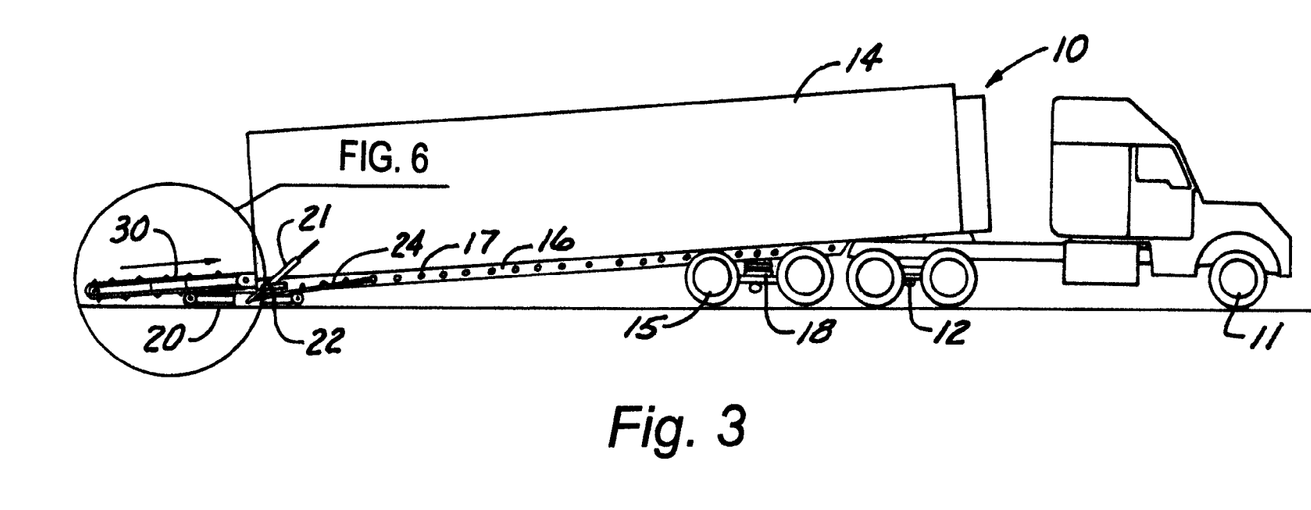
FIG. 3 is a side elevational view of the bale loading trailer shown in FIG. 2, but with the trailer tilted so the tail of the trailer is lowered and the rear end of a loading conveyor is close to the ground.

The trailer 14 has a rear set of wheels 15 that can slide along a beam or beams 16 and pinned through apertures 17 therein to say at the place shown in FIG. 2, or moved to the place shown in FIG. 3, for example. The rear set of wheels 15 are connected to the frame of the trailer 14 with an air bag suspension system 18 like those available from SAF-Holland Neway such as their ADZ air suspension system, and as illustrated in their patent portfolio, such as shown in their U.S. Pat. Nos. 6,073,946 and 6,398,236, both to Richardson, which patents are incorporated herein by reference in their entirety. These air suspension systems are well known to those skilled in the semi-trailer/truck field.

Figure 5:
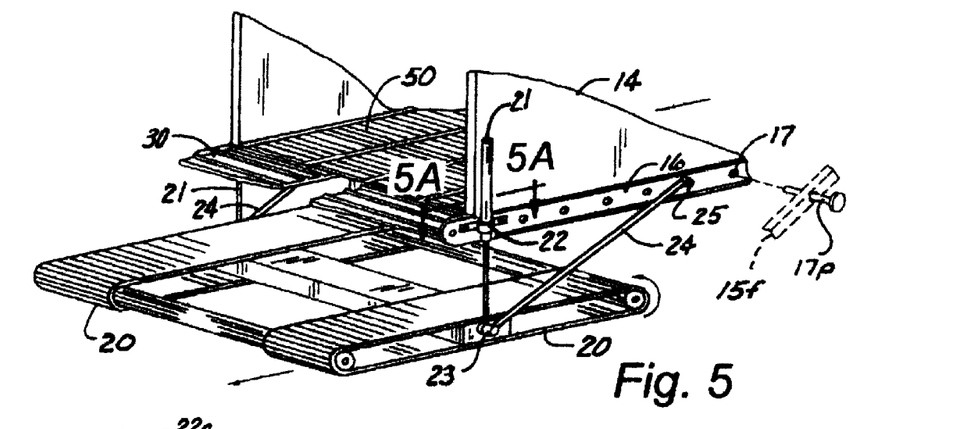
FIG. 5 is a perspective view of the FIG. 2 configuration before the trailer is tilted and with the loading conveyor broken away to show the ground engaging tracks engaged to move the trailer rearwardly.

FIGS. 1, 2 and 5 shows how a ground engaging track system 20 is attached to the trailer using a pair of hydraulic cylinders 21 pivotally attached at the rear of the trailer at trunnion joint 22 and to the track system 20 at the bottom at points 23. Braces 24 are also pivotally attached at pivot point 23 at one end and at pivot point 25 at the other end thereof. The track system can be operated using electric or hydraulic motors (not shown) to run the ground engaging tracks 26 in either the direction.

To get the tandem wheels 15 from the position shown in FIG. 1 to the position shown in FIG. 2, the brakes on the set of wheels 15 would be locked by setting the air on them, removing the pin or pins (not shown) connected the set of wheels 15 to the beam 16 and then backing up the tractor and trailer using the tractor, or using the tracks 20 to move the trailer and tractor in the direction shown in FIG. 5 from the position shown in FIG. 1 to the position shown in FIG. 2. By doing that, the set of wheels 15 will slide forward on the beam 16 as the trailer 14 moves backwardly.

After that, the air in the airbag suspension system 18 in the tandem wheels 15 is released, allowing the weight of the rear of the trailer 14 to move down from the position shown in FIG. 2 to the tipped position shown in FIG. 3. With the trailer 14 tilted and the tail of the trailer lowered, the rear end of a loading conveyor 30 is close to the ground as shown in FIGS. 3, 4 and 6.

Figure 4:
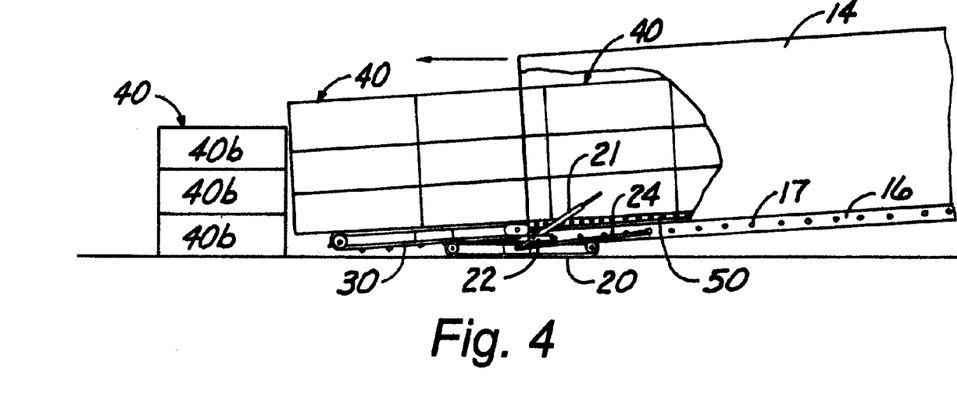
FIG. 4 is a side elevational view of the bale loading trailer shown in FIG. 3 with a portion of the sidewall broken away to show stacks of bales being loaded into the trailer, first by the loading conveyor and then when the stacks enter the trailer, by a moving floor.
Figures 5A, 6:
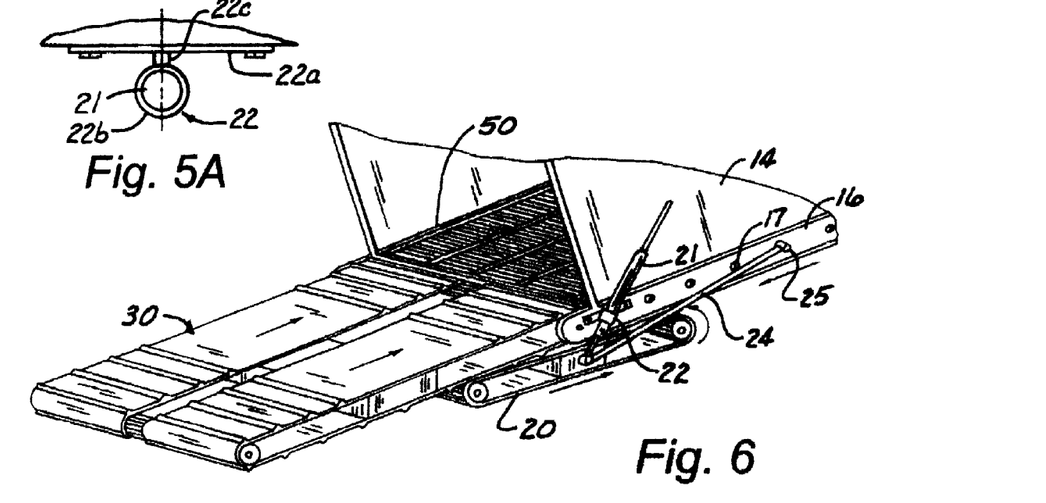
FIG. 5A is a cross sectional view taken along line 5A-5A in FIG. 5, showing a trunnion mount for a hydraulic cylinder but not showing the hydraulic cylinder itself.
FIG. 6 is a perspective view of the FIG. 3 configuration with the trailer tilted and with the rear end of the loading conveyor close to the ground and showing the ground engaging tracks engaged to move the trailer rearwardly so that when the lowered rear end of the loading conveyor first engages a stack of bales, the stack will begin to move upwardly and forwardly onto the loading conveyor and eventually onto the moving floor as shown in FIG. 4.

FIG. 4 is a side elevational view of the bale loading trailer shown in FIG. 3 with a portion of the sidewall broken away to show stacks 40 of bales 40b, which could be 6 in a stack, called "six packs", being loaded into the trailer 14, first by the loading conveyor 30 and then when the stacks 40 enter the trailer 14 they are moved forwardly by a moving floor 50. They can be unloaded by reversing the moving floor 50 and loading conveyor 30 as will be explained in more detail below. It is noted that the loading/apron conveyor 30 is shown to be rubber conveyor belts, but a chain conveyor system can be used instead of the rubber conveyor belts. Such chain conveyor system can be like gathering chains 410 shown in FIG. 5 of Published U.S. Patent Application No. 2010/0318150 to a Bale Picking Truck by Kelderman referred to above and incorporated herein by reference.

The moving floor 50 is well known to those skilled in this art and is available commercially, for example, as a Keith Walking Floor™ such as those shown and disclosed in U.S. Pat. Nos. 8,006,828, 7,789,218, 7,736,114, 7,604,109, 7,556,141 and 7,398,873, these patents, being hereby incorporated herein by reference in their entirety. In general these patents disclose a "moving floor" to move materials on the floor of a trailer either forward or backward. The phrases "moving floor" and "walking floor" are deemed to be synonymous and are defined as the broad category of devices disclosed in the above identified patents which are used to move the goods forward or rearward on a trailer floor. A "moving floor" is intended to be generic to a "walking floor" and a "power floor", terms which are commonly used in the trailer field to describe trailer floors that move forwardly or rearwardly to selectively move a load in or out of a trailer.

Figure 4A:
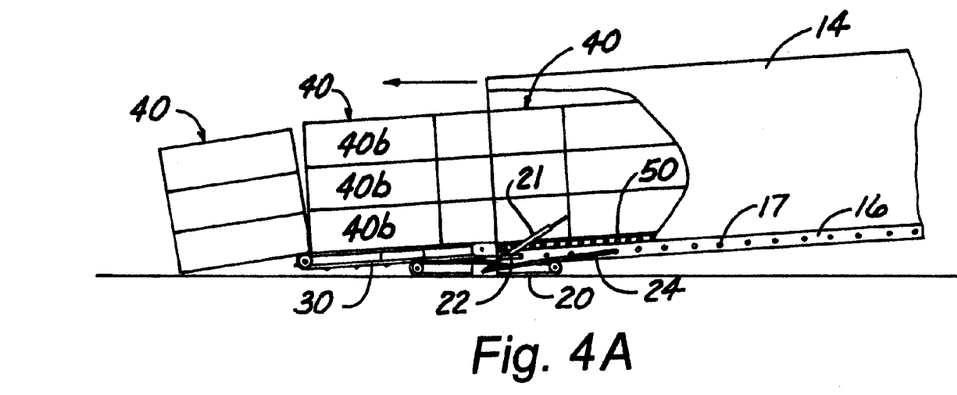

FIG. 4A is a side elevational view of the bale loading trailer shown in FIG. 4 with a portion of the sidewall broken away to show stacks 40 of bales 40b, in a further/later stage of being loaded into the trailer 14 than in FIG. 4. When the rear end (left end as shown in FIG. 4) of the loading conveyor 30 close to the ground hits the stack 40 of bales that is still on the ground the loading conveyor will lift the stack 40 up to the tipped position shown in FIG. 4A and ultimately onto the top of the loading conveyor 40 as the stacks 40 in front of that last stack 40 are moved into the trailer 14 by using the moving floor 50. So when the trailer 14 is eventually tilted back to the position shown in FIG. 1 the trailer will be full of stacks 40 and one stack 40 will be resting on top of loading conveyor as well. It is anticipated that this stack can then be strapped down for safely driving the entire loaded unit 10 to wherever the stacks of bales 40 are needed for use and unloading.

FIG. 5 is a perspective view of the FIG. 2 configuration before the trailer 14 is tilted and with the loading conveyor 30 broken away to show the ground engaging tracks 20 engaged to move the trailer 14 rearwardly and FIG. 6 is a perspective view of the FIG. 3 configuration with the trailer 14 tilted and with the rear end of the loading conveyor 30 close to the ground and showing the ground engaging tracks 20 engaged to move the trailer 14 rearwardly so that when the lowered rear end of the loading conveyor 20 first engages a stack 40 of bales 40b, the stack 40 will begin to move upwardly and forwardly onto the loading conveyor 30 and eventually onto the moving floor 50 as shown in FIGS. 4 and 4A.

FIGS. 5, 5A and 6 also show a simplified trunnion mount 22 for the hydraulic cylinder 21. A plate 22a is bolted to the frame. Circular strap 22b encircles the hydraulic cylinder 21 and is frictionally held in place with respect to the cylinder 21. The circular strap 22b is pivotally mounted along the dashed line axis shown in FIG. 5A to the plate 22a so that the cylinder can pivot between the position shown in FIG. 5 and the position shown in FIG. 6. Other types of trunnion mounts can be used instead of the simplified one 22 that is shown in FIG. 5A.

Figure 7:
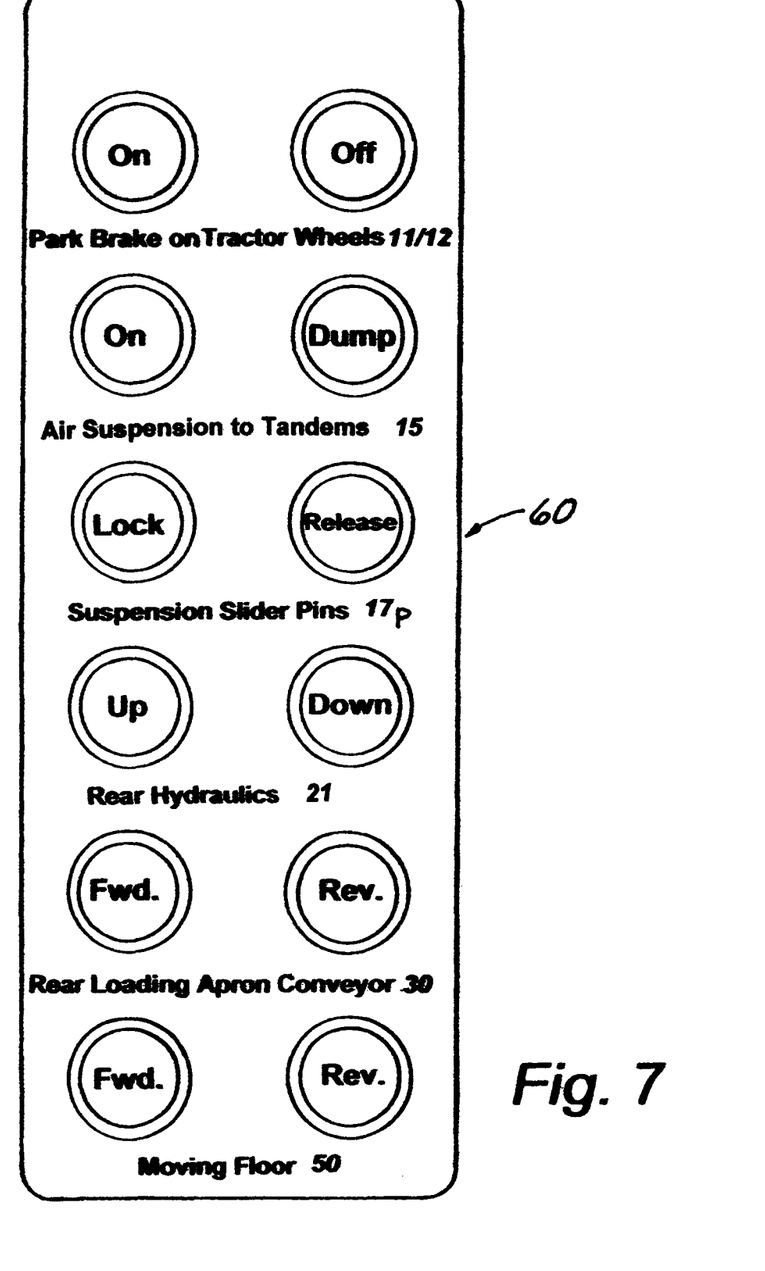
FIG. 7 is a schematic view of a remote control that is used to control the parking brake on the tractor, the air suspension system, the suspension slider, the rear hydraulic cylinder to move the tracks up or down, the starting/loading apron conveyor and the moving floor.

FIG. 7 is a schematic view of a wireless remote control 60 that is used to control the parking brake on the tractor 11, the air suspension system 12 on the trailer 14, the suspension slider pins 17p that selectively pin the frame 15f of the tandem wheels 15 to the trailer frame 16 at holes 17 as shown in FIGS. 1-3 and 5, the rear hydraulic cylinder 21 to move the tracks 20 up or down, the starting/loading apron conveyor 30 and the moving floor 50. Other parts of the operation of the present invention as shown in FIG. 8, for example, could optionally be built into the remote control 60.

Figure 8:
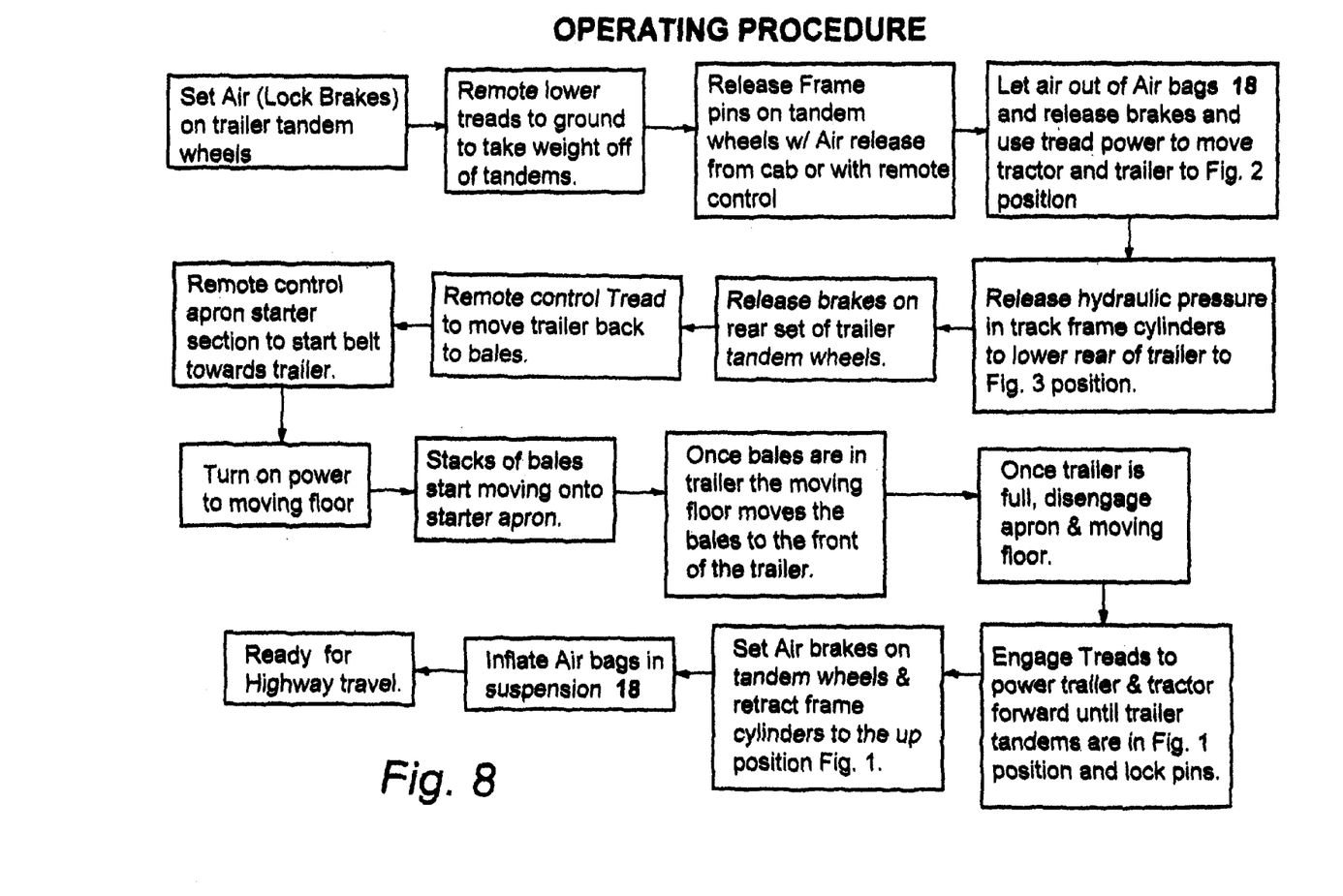
FIG. 8 is a flow chart showing an example of a sequential operation of the present invention though the invention is not limited to this sequence of operation unless specified to be a certain way in one or more of the independent claims of this document.

FIG. 8 is a flow chart showing an example of a sequential operation of the present invention though the invention is not limited to this sequence of operation, noting that the speed of the moving floor and the apron starter are synchronized so that the stacks of bales move at the same speed on both the apron starter 30 and the moving floor 50. The loading process is essentially just reversed in order to unload the stacks of bales, as will be easily appreciated by those skilled in this field.

Figure 9:
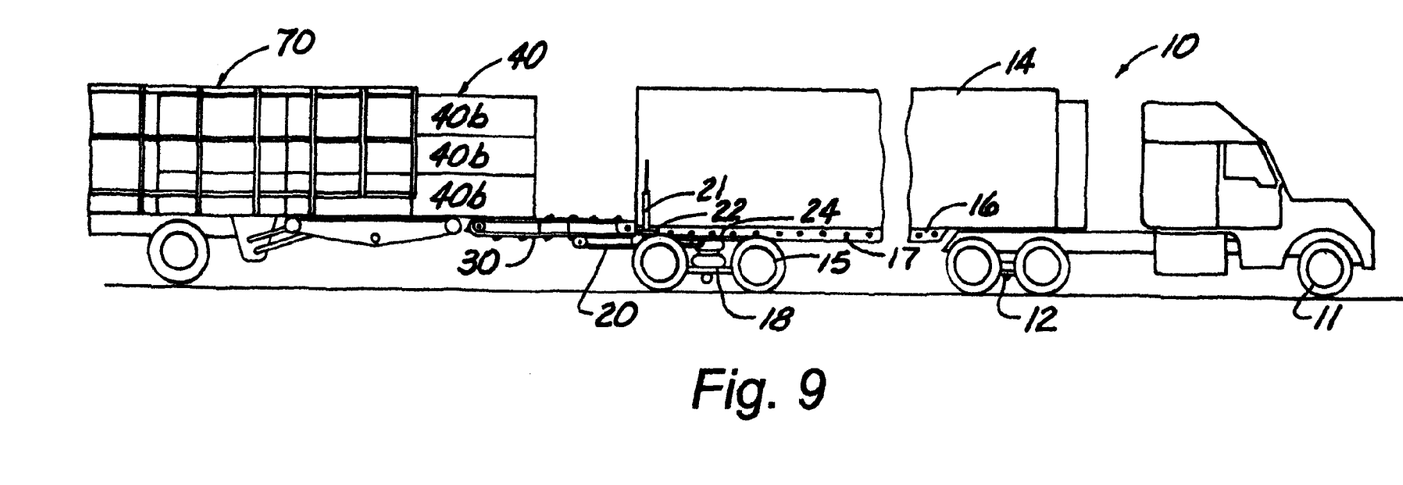
FIG. 9 is a side elevational view of a bale loading trailer as shown in FIG. 1 but being backed up to a bale picking truck of the type shown in Published U.S. Patent Application No. 2010/0318150 so that stacks of bales on the bale picking truck can be unloaded directly onto and into the bale loading trailer of the present invention, thereby omitting the steps where the bale picking truck would need to unload the stacks of bales onto the ground and the bale loading truck would need to be tilted and backed into the stack of bales on the ground to load them into the bale loading truck.

FIG. 9 is a side elevational view of a bale loading trailer 10 as shown in FIG. 1 but being backed up to a bale picking truck 70 of the type shown in Published U.S. Patent Application No. 2010/0318150 so that stacks of bales on the bale picking truck 60 can be unloaded directly onto and into the bale loading trailer 10 of the present invention, thereby omitting the aforementioned steps where the bale picking truck would need to unload the stacks 40 of bales 40b onto the ground and the bale loading truck 10 trailer 14 would need to be tilted and backed into the stack of bales 40 on the ground to load them into the bale loading truck 10.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. An apparatus for picking up bales and moving them into and/or out from a trailer comprising:
    (a) a trailer having a frame, the frame having a front and a rear;
    (b) a floor operatively attached to the frame, at least a part of the floor being a moving floor, the floor having a front and a rear;
    (c) the frame adapted to be operatively attached to a prime mover near the front of the frame for permitting pivoting of the frame along a generally vertical axis and along a generally horizontal axis for permitting the trailer to be towed and for being pivoted between a raised transport position and a lowered loading/unloading position;
    (d) a set of wheels operatively attached to the frame and, the set of wheels being moveable between a first position near the rear of the frame and a second position nearer to the front of the frame;
    (e) a locking device for selectively locking the set of wheels in a first or second position thereof;
    (f) a ground engaging device operatively attached to a rear portion of the frame for selectively pulling the trailer rearwardly or pushing the trailer forwardly, the ground engaging device also having a non-ground engaging raised position for when the trailer is being used in the transport position thereof; and
    (g) a starter conveyor section operatively attached to the rear of the frame with a forward end being adjacent to the rear of the floor, the starter conveyor section having a first elevated position when the frame is in transport position and a second position close to the ground when the trailer is in the tilted loading/unloading position.

2. The apparatus of claim 1, further comprising a control device for independently operating the moving floor, the ground engaging device and the starter conveyor section.

3. The apparatus of claim 1 further comprising a prime mover disposed on wheels for towing and/or pushing the trailer.

* * * * *